Figure 1:
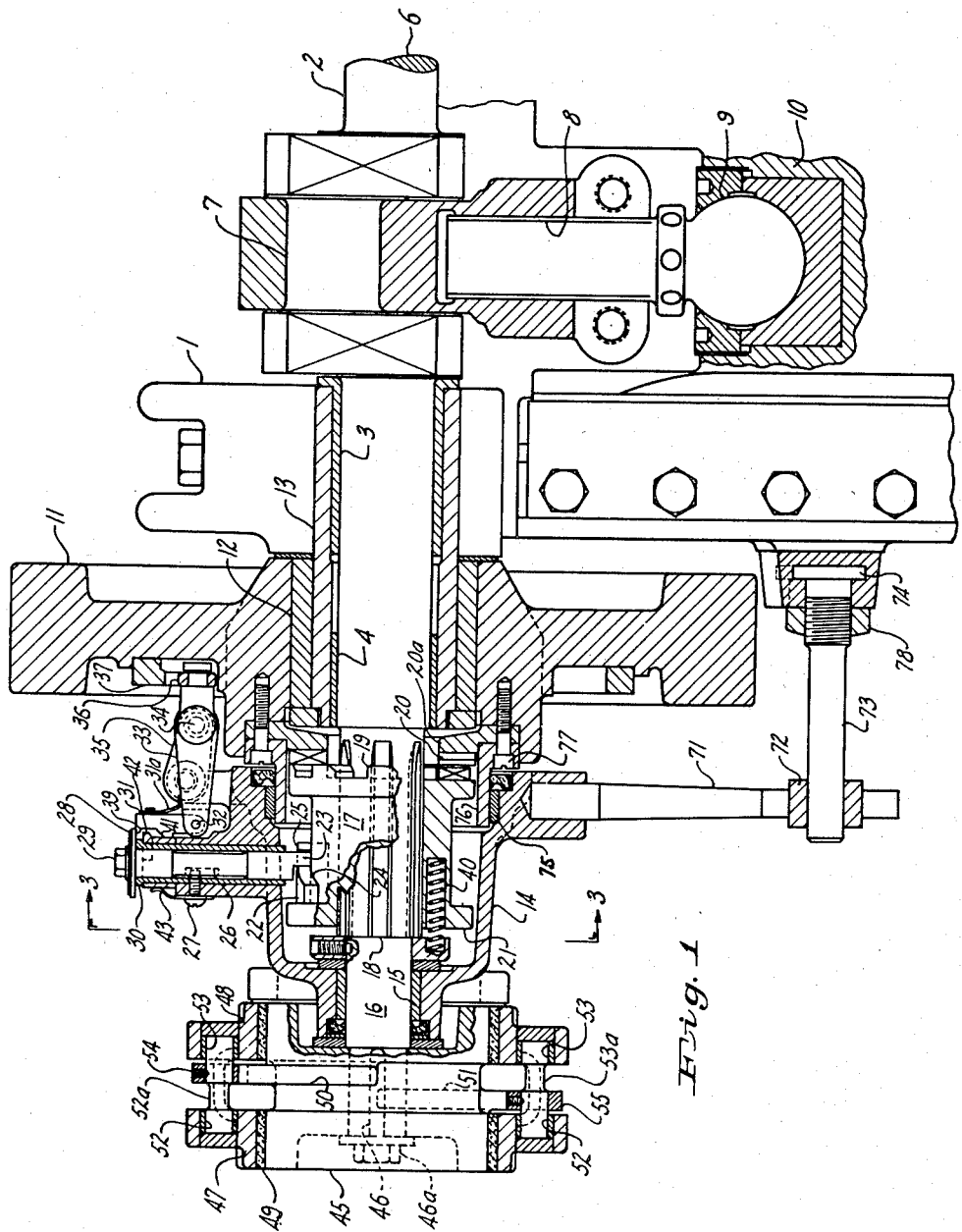

Jan. 14, 1947.  C. H. HOOK  2,414,304
CLUTCH MECHANISM
Filed July 5, 1943  4 Sheets-Sheet 1

INVENTOR.
Charles Howard Hook
BY William B. Jaspert
Attorney.

Jan. 14, 1947.   C. H. HOOK   2,414,304
CLUTCH MECHANISM
Filed July 5, 1943   4 Sheets-Sheet 2
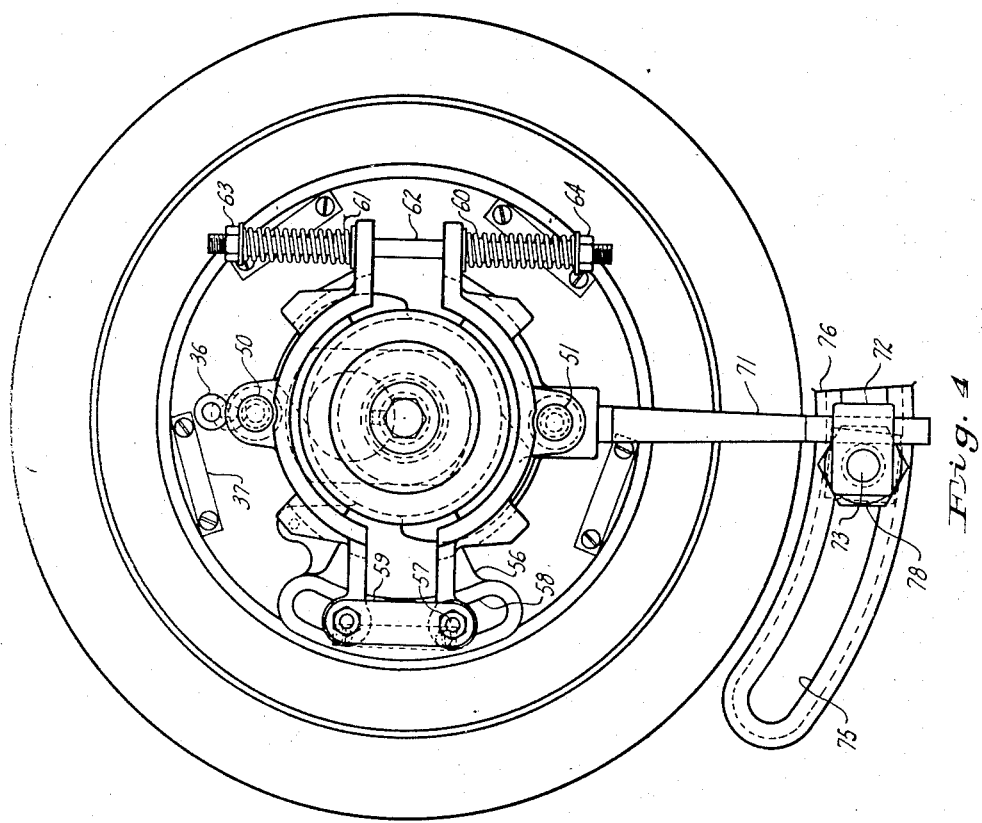
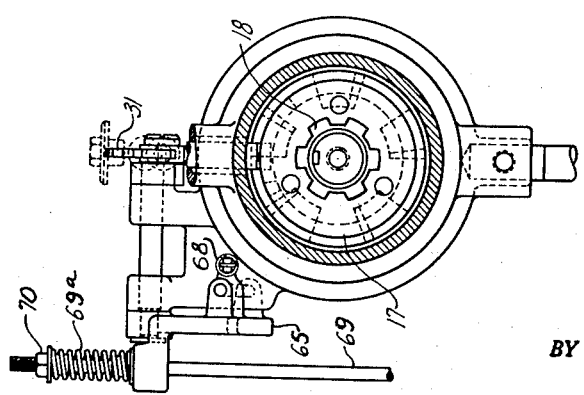
INVENTOR.
Charles Howard Hook
BY William B. Jaspert
Attorney.

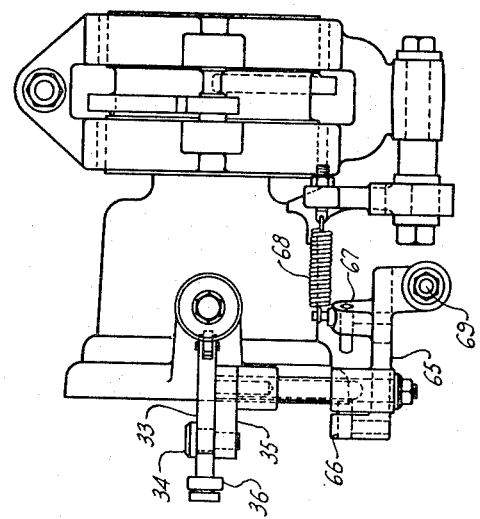
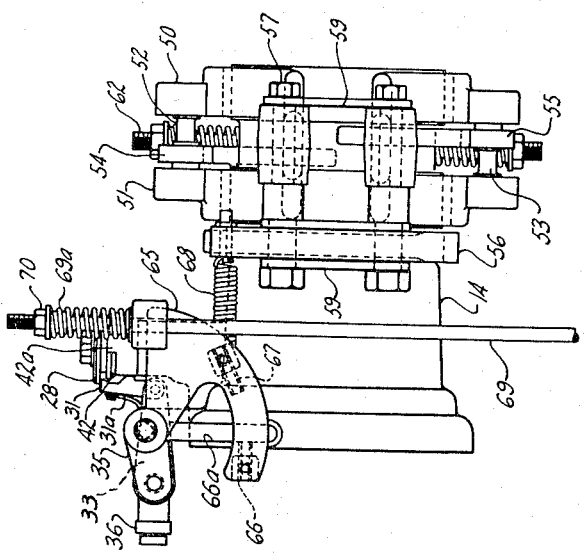

Jan. 14, 1947.    C. H. HOOK    2,414,304
CLUTCH MECHANISM
Filed July 5, 1943    4 Sheets-Sheet 4
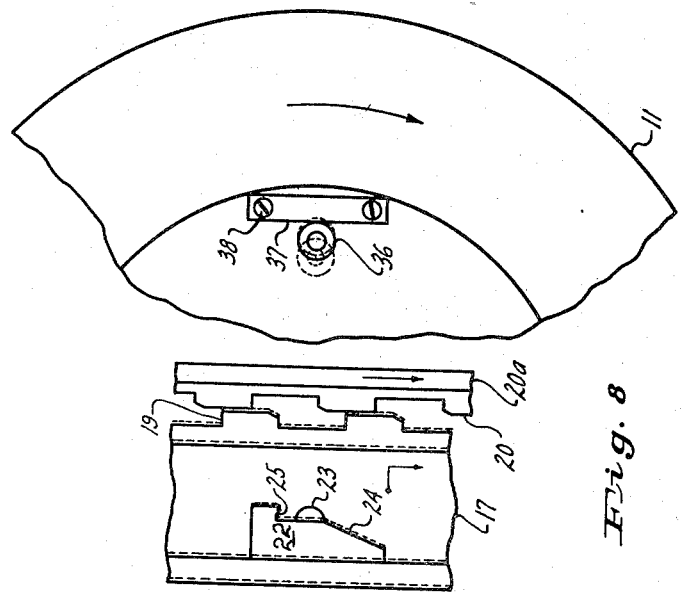
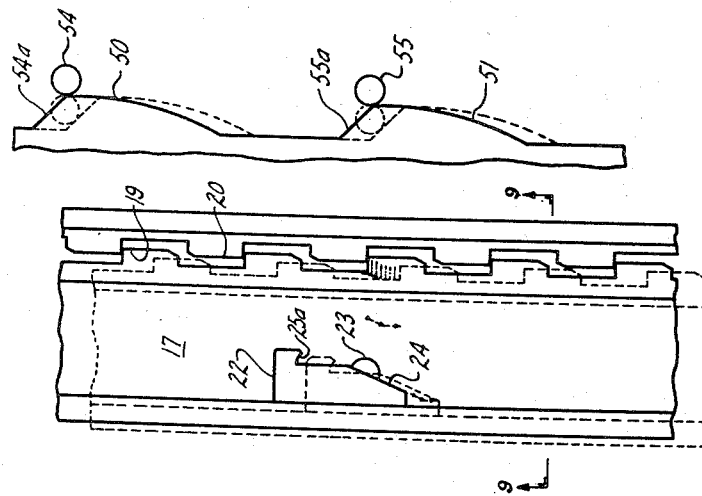 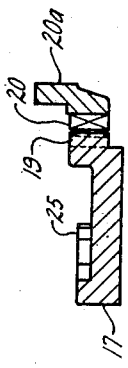
INVENTOR.
Charles Howard Hook
BY William B. Jaspert
Attorney.

Patented Jan. 14, 1947

2,414,304

UNITED STATES PATENT OFFICE 2,414,304

CLUTCH MECHANISM

Charles Howard Hook, Pittsburgh, Pa.

Application July 5, 1943, Serial No. 493,524

22 Claims. (Cl. 192—12)

This invention relates to improvements in clutch mechanism for power driven punch presses, shears, forming die presses and the like, and it is among the objects thereof to provide a clutch mechanism especially designed to eliminate wear and prevent clashing of the edges of the clutch teeth in their clutch engaging movement.

It is a further object of the invention to provide clutch mechanism which shall remove the load from the clutch teeth prior to their disengagement.

It is a further object of the invention to provide clutch mechanism which shall remove the friction load from the declutching cam and knife switch during the declutching operation.

It is another object of the invention to provide mechanism for speeding up the driven member at the time of or preliminary to the disengaging movement of the clutch.

A further object of the invention is the prevention of accidental engagement of the clutch elements while idling and to provide positive spaced position of the clutch parts when not engaged.

Another object of the invention is the provision of a clutch drive that is journalled independently of the crank shaft thereby reducing the friction load on the clutch brake.

It is still a further object of this invention to provide a declutching brake release for the driven member which shall be coordinated with the declutching mechanism.

These and other objects of the invention will become more apparent from a consideration of the accompany drawings constituting a part hereof in which like reference characters designate like parts and in which:

Fig. 1 is a vertical cross-sectional view of an improved clutch mechanism and drive therefor embodying the principles of this invention;

Fig. 2 a top plan view of a knife switch cam and stop;

Fig. 3 a cross-sectional view of the clutch mechanism taken along the line 3—3, Fig. 1;

Fig. 4 an end elevational view of the clutch mechanism shown in Fig. 1;

Fig. 5 a side elevational view of the clutch mechanism;

Fig. 6 a top plan view thereof;

Fig. 7 a diagrammatic view of a cam, clutch and knife switch stop;

Fig. 8 a diagrammatic view of a portion of the flywheel and a lay-out of the clutch teeth in relation to the clutch release or knife edge actuator device; and Fig. 9 a cross-section of the clutch taken along the line 9—9, Fig. 7.

With reference to Fig. 1 of the drawings, the numeral 1 designates one side or column of a machine frame and 2 a crank shaft which is journalled in the frame by bearings 3 and 4. Shaft 2 is broken away at 6 and extends across the punch press or other periodically operating machine, the opposite end being similarly journalled in an upright 1 (not shown). Shaft 2 is provided with a pair of cranks 7, one of which is shown, the other being on the cut-off portion of the shaft.

Cranks 7 carry the connecting rods 8, which are joined by ball and socket joint 9 to the cross-frame 10, on which cutting shears, punch dies or forming dies are supported. In operation, rotation of shaft 2 causes a vertical reciprocatory movement of the rams and supporting cross-frame.

A drive wheel or flywheel 11 is journalled by bearings 12 on a sleeve 13 which may be termed a hollow stud shaft that is mounted in the machine frame 1, the inner wall of the sleeve constituting the bearing support for the crank shaft 2. This construction of the drive wheel on a hollow stud shaft which is fixed against rotation is a novel feature of my invention and functions to eliminate the load on the clutch and brake mechanism, as will be hereinafter described.

Mounted on the shaft 2 is a clutch housing 14 journalled by bearing 15 to the journal neck 16 of the crank shaft. The clutch housing is also journalled on an extension sleeve of the driven wheel 11 as will be hereinafter described. A sliding clutch generally designated by the numeral 17 is mounted on splines 18 of the crank shaft 2. The clutch sleeve 17 is provided with teeth 19 that interact with teeth 20 of the drive clutch 20a on wheel 11, the clutch sleeve 17 being provided with a flange 21 at its other end. A clutch operating cam 22 that engages a knife switch 23 is mounted on sleeve 17 or may be formed integrally therewith, these parts being more clearly shown in Figs. 7 and 8 of the drawings.

Upon rotation of the clutch sleeve 17, the knife switch 23 will abut against the cam face 24 to displace the sleeve and disengage the clutch, and the knife switch 23 strikes an over-travel stop 25, which is more clearly shown in Fig. 2.

The knife switch 23 is mounted on the housing 14 and is movable vertically within the limits of a slot 26 that engages a screw 27 which allows some angular movement of the knife switch and a limited amount of vertical movement. The knife switch is provided with a collar or washer 28 that is secured thereto by the bolt 29, the collar resting upon a flanged sleeve 30 secured in the extension of the bracket 14. The knife switch 23 is subjected to vertical movement to disengage the cam 22 by means of a pawl 31 which is pivoted at 32 to a lever 33 which in turn is pivoted at 34 to arm 35 of a bell crank, the end of lever 33 having a follower 36 that engages a trip block or cam lugs 37 provided on one side of the drive wheel, five lugs being shown in Fig. 4 of the drawings.

The pawl 31 is provided with a spring 31a which rests on lever 33 to bias the pawl against the knife switch. As shown in Fig. 8, the cam lug 37 is secured to the side of the drive wheel by screws 38 but may be formed integrally therewith, and the follower 36 is shown in contact with the cam face.

With reference to Fig. 1, the pawl 31 is provided with a finger 39 that strikes the under-side of the knife switch collar 30 and lifts the knife switch 23 out of engagement with the cam 22.

The clutch sleeve is then forced into engagement with the face of the drive wheel clutch 20 by coil springs 40. The pawl 31 is further provided with a bevelled lug 41 which strikes a bevelled or chamfered surface of a sleeve 42 to throw the trip finger 39 out of alignment with the knife switch collar 28 to allow the knife switch to drop, thereby preventing repeat operation until the foot pedal is again operated. The sleeve 42 is provided with a notch 42a, Fig. 5, through which the pawl 31 may travel without lug 41 contacting the member 42, thereby maintaining alignment of the pawl 31 and knife switch collar 28 to maintain continuous operation when the foot pedal is held depressed. Notch 42a may be aligned with pawl 31 by simply turning sleeve 42, and a spring 43 is provided to yieldingly hold the trip collar or sleeve 42 to the aligned position.

A brake drum 45 is mounted on the end of the crank shaft 2 and secured thereto by a key 46 and nut 46a. Brake shoes 47 and 48 engage the drum, as shown, and are provided with brake lining 49.

A plurality of cam lugs 50 and 51 are formed integrally with the brake drum 45 but may be otherwise joined thereto, and the brake shoes 47 and 48 are provided with journals 52 and 53 for shafts 52a and 53a, respectively, which carry cam followers 54 and 55 that engage the cams 50 and 51.

As shown in Fig. 4 the brake shoes are secured to a bracket 56 by bolts 57 slidable in a slot 58, the bolts being provided with nuts and are cross-connected by a spacing link 59. The opposite end of the brake shoes are yieldingly biased against the brake drum by coil springs 60 and 61 mounted on a bolt 62 and held by nuts 63 and 64.

As shown in Figs. 3, 5 and 6, the arm 35 that operates lever 33 to engage the cam follower 36 with the cam lugs 37, of which there are five shown in Fig. 4, is mounted on a rocker shaft which is actuated by a quadrant 65 having adjustable stop lugs 66 and 67, the latter being connected by coil spring 68 to normally bias stop 66 against its abutment 66a, in which position cam follower 36 is in its out-of-contact position. The quadrant 65 is actuated by a trip rod 69 that is operated by a foot pedal (not shown) in the conventional manner. The trip rod is provided with a coil spring 69a having an adjusting nut 70 to vary the tension between the rod and the quadrant bracket 65 which it operates. When the quadrant is moved by the trip rod 69 against stop 67, lever 33 that carries the cam follower 36 will be raised into the path of travel of the cam lugs 37 and pawl 31 will strike collar 28 of the knife switch to raise it. When the foot pedal is released, spring 68 will return the quadrant 65 against stop 66.

As shown in Fig. 4, the housing 14 is provided with an arm 71 that is held by a block 72 mounted on a stud 73 having a flanged end 74 that is slidable in the slot 75 of a guide bracket 76 mounted on the side of the upright frame 1.

As shown in Fig. 1, the housing 14 is movable on bearings 75 operable on a sleeve 76 that is secured by bolts 77 to the drive wheel 11. These bolts also fasten the drive clutch 20a to the drive wheel. By moving the arm 71, the angular position of the housing may be changed within the limits of travel of the studs 73 in the slot 75 for a purpose to be hereinafter described. Stud 73 may be locked in position by nut 78.

The operation of the above described clutch mechanism will be better understood from the diagrammatic views of the clutch and cams in Figs. 7 and 8 of the drawings.

Fig. 7 is a projection of the drive and driven elements showing the relation of the clutch teeth 19 and 20 to the clutch operating cam 22 and knife switch 23. Fig. 7 also shows the relation of the clutch teeth to the cams 50 and 51 and the brake rollers 54 and 55.

Fig. 8 diagrammatically illustrates the relation of the clutch teeth, the clutch cam knife switch and the cam lug of the drive wheel which coact as follows:

As shown by the dotted lines in Fig. 8, clutch teeth 19 abut the front faces of the drive clutch 20 when the knife switch 23 has been lifted clear of the cam 22. This occurs when the cam follower 36 strikes the cam lug 37 of the drive wheel, which trips lever 33 and causes pawl finger 39 to engage the flange collar 28 of the knife switch and lift it clear of the cam. When this occurs, the coil springs 40 move clutch sleeve 17 in abutting engagement with the drive clutch only when the teeth are in a position shown in Fig. 8 where they are face to face, as shown by the dotted lines.

In this manner it is impossible for the teeth to engage when the teeth 19, for example, are in register with the spaces between the clutch teeth 20, which would result in clashing of the sharp corners of the teeth and the speedy destruction of the clutch members. Because of this feature, the clutch elements may be made from mild tool steels and need not be heat treated as is the conventional practice.

Wear on the clutch teeth resulting from disengagement of the clutch is prevented in the manner shown in Fig. 7 wherein the clutch teeth are illustrated as partially disengaged with the knife switch 23 on the rise of the cam face 24 at a point where further movement of the driven clutch would result in complete disengagement of the clutch teeth.

At this point, the brake rollers 54 and 55 are on the rise at the extreme upper end of the cams 50 and 51, in which position separation of the brake shoes 48 and 49 has been effected against the tension of the brake springs 60 and 61. The releasing of the brake pressure is important and occurs when the cranks 1 of the driven shaft 2 are in their upper or raised position. Consequently the load on the cam face 24 and knife switch is negligible. When the brake shoe rollers 54 and 55 pass over the peak of the cams 50 and 51, as shown in dotted lines in Fig. 7, the force of the brake shoe springs 60 and 61 contracts the rollers into the inclines 54a and 55a of cams 50 and 51. Since the brake is released at this time, the force of the springs 60 and 61 will speed up the driven element so as to remove the load from the clutch teeth 19, and space them in an angular direction out of contact with the drive clutch teeth 20 before the knife switch 23 reaches the peak of the rise 24 of the clutch cam to complete the axial movement of the clutch sleeve 17 to the position shown in full lines in Fig. 8. In this manner there can be no wiping action of the coacting clutch teeth faces in the disengaging movement of the clutch teeth, which would result in wear or the breaking off of the sharp edges of the teeth as in the conventional type of clutch mechanism. Also there is no wear on the knife switch 23 and cam face 24 because both the brake pressure and drive load are removed at the time the knife switch passes over the peak of cam face 24.

When the brake shoe rollers 54 and 55 have dropped into the valley of the cams 50 and 51, the coil springs 60 and 61 will effect intimate contact of the brake shoes 47 and 48 with the brake drum 45 to hold the drive mechanism in idle position. In conventional practice the brake is constantly applied on the driven member during the entire cycle of operation of the press including the clutch and declutching of the drive member. By utilizing cam actuated brake shoes in the instant case, the brake load is released during the declutching operation thereby eliminating wear on the knife switch.

On extremely heavy equipment where it would be necessary to employ large and powerful brake springs to obtain the speed-up driving action by the forceable displacement of the driven element between brake rollers 54 and 55, the arm 71 may be adjusted to turn the housing to change the relative position of knife switch 23 and the peak of cam face 24 so that the peaks of the cams 50 and 51 lag slightly behind the highest point of the cranks 7 of shaft 2. In such case the weight of the press or shear ram on large machines in starting to descend will aid the springs 60 and 61 in securing momentarily increased speed of the driven element for the purpose of releasing the load on the clutch teeth before the brakes close on drum 45.

The arm 71 is a flexible member that will absorb crank shaft over-travel shock when the over-travel stop 25a strikes the knife switch 23. Arm 71 thus serves as a shock absorber and also to permit angular adjustment of the clutch housing 14 as described above.

The journalling of the drive wheel 11 on the hollow stud shaft 13 eliminates the friction load that would otherwise be carried by the driven clutch at the instance of declutching, which makes it possible to employ the spring drive of the brake shoes to speed up the driven clutch member as explained above to remove the load from the clutch teeth prior to their disengagement.

The hereinbefore described clutch mechanism eliminates clashing of clutch teeth and spalding of the metal at the time of engagement and disengagement of the clutch members, thereby eliminating the hazards resulting from defective clutch elements which has been recognized as a serious menace to the safety of the operators of this class of machine equipment.

Also as shown in Fig. 8 of the drawings, the constant rubbing engagement of the clutch faces is eliminated by the provision of adequate space between the juxtaposed clutch elements in which the driven clutch member is positively held by the knife switch until the latter is released through the trip action of the cam follower when engaging the cam lug 37 on the drive wheel. This feature prevents the accidental engagement of the clutch elements which frequently occurs in worn-out clutches where the faces are in rubbing contact due to the rapid wear on the knife switch, caused by excessive brake pressure which in the conventional clutch drive is never released.

By means of the knife edge trip mechanism, the drive mechanism may be operated through a single cycle when the foot treadle attached to the trip rod 65 is depressed or the drive mechanism may be repeatedly operated by maintaining the foot pedal in the depressed position. In the latter case the sleeve 42 is turned to align the notch 42a with the pawl 31, so that trip finger 39 will strike the flange collar 28 each time a cam lug 37 contacts the trip follower 36. Regardless of which operation is followed, the clutch mechanism will always go through the same engaging and disengaging cycle during each revolution of the drive mechanism.

Although one embodiment of the invention has been herein illustrated and described, it will be evident to those skilled in the art that various modifications may be made in the details of construction without departing from the principles herein set forth.

I claim:

1. In a drive mechanism, a drive and a driven member, a clutch element rotatable with the drive member, a clutch element rotatable with the driven member movably mounted for engagement with the drive clutch, a knife switch for disengaging the driven clutch and means operative by the drive member for releasing said knife switch when the coacting clutch elements are in juxtaposed alignment to bring said clutch elements in abutting relation preliminary to the clutch engaging movement of the clutch elements.

2. In a drive mechanism, a drive and a driven member, a clutch element rotatable with the drive member, a clutch element rotatable with the driven member movably mounted for engagement with the drive clutch, a knife switch for disengaging the driven clutch, a lifting device for said knife switch comprising a pawl mounted on a lever having a cam follower on one end thereof for engagement with a cam on the drive member, a lever arm movable between fixed limit stops for actuating said trip lever, said arm being normally biased by a spring in the direction to maintain the trip lever follower out of contact with the drive cam, said arm being biased by coil spring to normally maintain the trip lever follower out of alignment with the drive cam.

3. In a drive mechanism, a drive and a driven member, a clutch element rotatable with the drive member, a clutch element rotatable with the driven member movably mounted for engagement with the drive clutch, a knife switch for disengaging the driven clutch, a clutch cam on said driven clutch member adapted for engagement with the knife switch to disengage the driven clutch, said clutch cam having an over-travel stop for engagement with the knife switch means normally biasing said driven clutch in the direction of clutching engagement of the clutch elements, means for lifting the knife switch to effect engagement of the clutch elements, said means comprising a pawl pivoted on a trip lever having a cam follower at one end thereof, a cam on the drive member for contacting said follower to trip the pawl to raise the knife switch out of contact with the cam and manual means for actuating said trip lever, said clutch cam having a predetermined relation to the clutch teeth of the driven member and the cam lugs of the drive member being angularly spaced with the teeth of the drive clutch so that the juxtaposed faces of the clutch elements will be brought in abutting relation when the knife switch is lifted.

4. In a drive mechanism, a clutch member rotatable with a drive member, a clutch member rotatable with and mounted for sliding movement on the driven member, means for engaging said clutch members, means operative in response to rotary movement of the clutch members for moving the driven clutch member out of engagement, and means operable by rotary movement of the clutch members for removing the load from the clutch member faces at the time of their disengagement.

5. Drive mechanism for a crank shaft comprising a drive and a driven member, said drive member having a clutch element rotatable therewith, a clutch sleeve mounted for sliding movement on the driven member for engagement with the clutch element of the drive member, a cam on said sleeve, a knife switch for said cam for moving said sleeve out of engagement with the drive clutch trip mechanism for moving the knife switch out of engagement with the clutch cam comprising a lever for actuating the knife switch, having a follower at one end, said drive member having cam lugs for engaging the follower of the trip lever whereby the driven clutch element is released for engagement with the drive clutch when the coacting clutch elements have their outer faces in abutting relation, whereby driving contact of the clutch elements is prevented at the instance of clutch engagement.

6. Drive mechanism for a crank shaft comprising a drive and a driven member, said drive member having a clutch element rotatable therewith, a clutch sleeve mounted for sliding movement on the driven member for engagement with the clutch element of the drive member, a cam on said sleeve, a knife switch for said cam for moving said sleeve out of engagement with the drive clutch trip mechanism for moving the knife switch out of engagement with the clutch cam comprising a lever for actuating the knife switch, having a follower at one end, said drive member having cam lugs for engaging the follower of the trip lever whereby the driven clutch element is released for engagement with the drive clutch when the coacting clutch elements have their outer faces in abutting relation, whereby driving contact of the clutch elements is prevented at the instance of clutch engagement, means for disengaging the clutch members when the crank shaft has turned through a complete revolution, a brake for said crank shaft, and means for releasing the brake at the instance of disengagement of the clutch members.

7. In a clutch operated drive mechanism, a drive member and a driven member having interacting clutch elements, one of said clutch elements comprising a clutch sleeve slidably mounted for engagement with the other of said clutch elements, said sleeve being normally biased in the direction of said other clutch element and having a cam coacting with a knife switch for moving the sleeve out of engagement with the other of said clutch elements, and a brake for said driven member operative in response to rotation thereof to release the brake to remove the brake pressure from said cam and knife switch during the declutching movement of the said sleeve.

8. In a clutch operated drive mechanism, a drive member and a driven member having interacting clutch elements, one of said clutch elements comprising a clutch sleeve slidably mounted for engagement with the other of said clutch elements, said sleeve being normally biased in the direction of said other clutch element and having a cam coacting with a knife switch for moving the sleeve out of engagement with the other of said clutch elements, and means for increasing the speed of the driven member during declutching engagement of the knife switch and declutching cam.

9. In a clutch operated drive mechanism, a drive member and a driven member having interacting clutch elements, one of said clutch elements comprising a clutch sleeve slidably mounted for engagement with the other of said clutch elements, said sleeve being normally biased in the direction of said other clutch element and having a cam coacting with a knife switch for moving the sleeve out of engagement with the other of said clutch elements, a drum mounted on the driven member, a plurality of brake bands for engagement by said drum, spring means for applying yielding pressure on the brake bands for intimate contact with the brake drums, said brake bands having rollers, and said drum having stationary cams for engagement with said rollers to separate the brake bands during the declutching engagement of the knife switch with the declutching cam.

10. In a clutch operated drive mechanism, a drive member and a driven member having interacting clutch elements, one of said clutch elements comprising a clutch sleeve slidably mounted for engagement with the other of said clutch elements, said sleeve being normally biased in the direction of said other clutch element and having a cam coacting with a knife switch for moving the sleeve out of engagement with the other of said clutch elements, a drum mounted on the driven member, a plurality of brake bands for engagement by said drum, spring means for applying yielding pressure on the brake bands for intimate contact with the brake drums, said brake bands having rollers, and said drum having stationary cams for engagement with said rollers to separate the brake bands during the declutching engagement of the knife switch with the declutching cam, said brake band separating cams being shaped to speed up the movement of the drum when the brake bands have reached their maximum separation.

11. In a drive mechanism for reciprocating presses and the like comprising a drive member and a driven member, said drive member being mounted on a stud shaft extending from an upright of the machine and said driven member being journalled within said stud shaft and passing therethrough, a clutch rotatable with the drive member and a clutch sleeve having teeth for interacting with the teeth of the drive clutch, said sleeve being mounted for axial movement on a spline of the driven shaft, a clutch housing journalled at one end on said driven shaft and journalled at its other end on an extension sleeve of the driving member, a knife switch carried by said housing and a cam mounted on the clutch sleeve for engaging said switch, springs biasing said clutch sleeve for clutch tooth engagement with the drive clutch, a brake drum mounted on said driven shaft, a plurality of hinged brake bands for said drum embodying spring means yieldingly urging said bands and contact with the drums, rollers on said brake bands, cam mechanism for engagement with said rollers to spread the brake bands to relieve the braking pressure on the drum, said cams being spaced in relation to the clutch cam to separate the brake bands during the time of disengagement of the clutch sleeve, and said brake drum cams being shaped to produce an advancing displacing action to speed up the driven member in response to the spring pressure on the cam rollers when the latter pass over the high point of the cam.

12. A clutch mechanism as set forth in the preceding claim characterized by an arm extending from said clutch housing adjustably secured at its extended end to the machine frame, said arm constituting a yielding member for absorbing over-travel shock and for adjusting the angular position of said housing to thereby vary the angular position of the clutch cam to the brake drum cams.

13. In a drive mechanism for presses and the like having a reciprocating slide, a clutch element on the drive member, a clutch element on the driven member, means for engaging said clutch elements, means for disengaging said clutch elements, a cam rotatable with said drive mechanism, and a power actuated follower engaging said cam, said cam being shaped to act upon the follower to store up power on the up-travel of the reciprocating slide and to release the stored up power force at the end of its up-travel stroke, the disengaging means being operable to separate the clutch elements during the speed-up of the slide.

14. In a drive mechanism for presses and the like having a reciprocating slide, a clutch element on the drive member, a clutch element on the driven member, means for engaging said clutch elements, means for disengaging said clutch elements, a cam rotatable with said drive mechanism, a power actuated follower engaging said cam, said cam being shaped to act upon the follower to store up power on the up-travel of the reciprocating slide and to release the stored up power force at the end of its up-travel stroke, the disengaging means being operable to separate the clutch elements during the speed-up of the slide, and means independent of said cam mechanism for positively stopping said slide when the clutch elements are disengaged.

15. In a drive mechanism for presses and the like having a reciprocating slide, of a drive shaft for said slide constituting a driven element, a driving member for said shaft having one of a pair of complementary clutch elements, a clutch for the driven element, means for engaging and disengaging said clutch elements including means for bringing the clutch members in abutting engagement preliminary to their clutch engaging function, and means for disengaging the clutch elements preliminary to their separation, said last-named means including a spring biased lever coacting with an abutment on the driven member operative by the driven member upon the return movement of the reciprocating slide to store up energy and means for releasing said energy to actuate said lever to speed up the driven member to remove the load from the clutch elements preliminary to the separation thereof.

16. A speed-up mechanism for a driven element including a drive mechanism, a clutch and clutch shifting means for engaging and disengaging said drive and driven members, and cam mechanism operative to disengage the clutch members preliminary to their separation including oppositely disposed symmetrically shaped cam tracks, followers abutting the cam tracks, power means including springs biasing said followers against the cam tracks, the relation of the cam to the clutch disengaging mechanism being such that it acts upon the followers to compress the springs to store up energy which is effective to speed up the driven member preliminary to the disengagement of the clutch members to separate the clutch elements, and means independent of said cam mechanism for positively stopping said driven member when the clutch is disengaged.

17. In apparatus including a reciprocating slide mounted on a crank shaft, a drive mechanism for said crank shaft including clutch mechanism for engaging and disengaging the drive and crank shaft, a cam rotatably mounted therewith and means operable by said cam for exerting a driving force on the crank shaft in excess of the load on said shaft to disengage the clutch elements preliminary to the separation thereof, said cam-actuated element comprising a lever having an arm for engaging the driven element, and a spring normally biasing the lever against said driven element, the shape of the cam being such to fully compress the spring on the upstroke of the reciprocating slide to exert maximum force on said lever to disengage the clutch elements preliminary to the separation thereof.

18. In apparatus including a reciprocating slide mounted on a crank shaft, a drive mechanism for said crank shaft including clutch mechanism for engaging and disengaging the drive and crank shaft, a cam rotatably mounted therewith and means operable by said cam for exerting a driving force on the crank shaft in excess of the load on said shaft to disengage the clutch elements preliminary to the separation thereof, said cam-actuated element comprising a lever having an arm for engaging the driven element, a spring normally biasing the lever against said driven element, the shape of the cam being such to fully compress the spring on the upstroke of the reciprocating slide to exert maximum force on said lever to disengage the clutch elements preliminary to the separation thereof, and an over-travel stop independent of said cam and in the path of movement of the driven element effective to arrest the movement of the driven element at the time of separation of the clutch elements.

19. A speed-up mechanism for a driven element including a drive mechanism, a clutch and clutch shifting means for engaging and disengaging said drive and driven members, and cam mechanism operative to disengage the clutch members preliminary to their separation including oppositely disposed symmetrically shaped cam tracks, followers abutting the cam tracks, actuating means for said followers biasing said followers against said cam tracks and operative in response to rotation of the cam to store up energy to speed up the driven member preliminary to the disengagement of the clutch members to separate the clutch elements, and means independent of said cam mechanism for positively stopping said driven member when the clutch is disengaged.

20. In a drive mechanism for presses and the like having a reciprocating slide, a clutch element on the drive member, a clutch element on the driven member, means for engaging said clutch elements, means for disengaging said clutch elements, a cam having a plurality of symmetrically shaped angularly spaced cam tracks, a plurality of followers for engaging said cam tracks, means biasing said followers against said cam tracks, said cam tracks being shaped to act upon the followers to store up power in said follower biasing means on the up-travel of the reciprocating slide and to release said stored up force at the end of the up-travel stroke of the slide to thereby speed up the driven element to disengage the clutch elements preliminary to the separation thereof.

21. In a drive mechanism for presses and the like having a reciprocating slide, a clutch element on the drive member, a clutch element on the driven member, means for engaging said clutch elements, means for disengaging said clutch elements, a cam rotatable with said drive mechanism, a power actuated follower engaging said cam, said cam being shaped to act upon the follower to store up power on the up-travel of the reciprocating slide and to release the stored up power force at the end of its up-travel stroke, the disengaging means being operable to separate the clutch elements during the speed-up of the slide, and means for adjusting the relative position of the speed-up face of the cam and clutch disengaging element.

22. In a drive mechanism for presses and the like having a reciprocating slide, a clutch element on the drive member, a clutch element on the driven member, means for engaging said clutch elements, means for disengaging said clutch elements, a cam rotatable with said drive mechanism, a power actuated follower engaging said cam, said cam being shaped to act upon the follower to store up power on the up-travel of the reciprocating slide and to release the stored up power force at the end of its up-travel stroke, said clutch disengaging means comprising a cam on the driven clutch element, a knife switch in the path of movement of the cam, and means for adjusting the angular position of the knife switch relative to said first-named cam.

CHARLES HOWARD HOOK.